United States Patent [19]

Kirker et al.

[11] Patent Number: 4,724,066

[45] Date of Patent: Feb. 9, 1988

[54] COMPOSITES OF MICROPOROUS ALUMINUM PHOSPHATES AND ZEOLITES AND CONVERSIONS OVER THESE CATALYSTS

[75] Inventors: Garry W. Kirker, Washington Twp.; Michael E. Landis, Woodbury; Jeffrey H. Yen, Swedesboro, all of N.J.

[73] Assignee: Mobil Oil Corporation, New York, N.Y.

[21] Appl. No.: 808,227

[22] Filed: Dec. 12, 1985

Related U.S. Application Data

[62] Division of Ser. No. 693,445, Jan. 22, 1985, abandoned.

[51] Int. Cl.[4] .............................................. C10G 11/04
[52] U.S. Cl. ........................................ 208/114; 208/28
[58] Field of Search ......................... 208/28, 114, 120

[56] References Cited

U.S. PATENT DOCUMENTS

| 3,755,138 | 8/1973 | Chen et al. | 208/28 |
| 4,310,440 | 1/1982 | Wilson et al. | 252/435 |
| 4,440,871 | 4/1984 | Lok et al. | 208/114 |
| 4,512,875 | 4/1985 | Long et al. | 208/114 |

FOREIGN PATENT DOCUMENTS

| 0185329 | 6/1986 | European Pat. Off. |
| 8603770 | 7/1986 | PCT Int'l. Appl. |
| 8603694 | 7/1986 | PCT Int'l. Appl. |
| 8603771 | 7/1986 | PCT Int'l. Appl. |

*Primary Examiner*—Carl F. Dees
*Attorney, Agent, or Firm*—A. J. McKillop; M. G. Gilman; E. F. Kenehan, Jr.

[57] ABSTRACT

There is provided a catalyst comprising a zeolite component and a microcrystalline, microporous aluminum phosphate component. Examples of the zeolite component are ZSM-5 and zeolite Beta, and an example of an aluminum phosphate component is $AlPO_4$-5. The aluminum phosphate component provides increased catalyst activity and lifetime. Also provided for in this disclosure are a method for making the zeolite/aluminum phosphate composite and a process for using this composite in the preparation or conversion of hydrocarbons, e.g., in a dewaxing process.

19 Claims, 2 Drawing Figures

COMPOSITES OF MICROPOROUS ALUMINUM PHOSPHATES AND ZEOLITES AND CONVERSIONS OVER THESE CATALYSTS

CROSS-REFERENCE TO RELATED APPLICATION

This is a division of copending application Ser. No. 693,445, filed on Jan. 22, 1985, now abandoned.

This application is related to U.S. application Ser. No. 693,444, filed Jan. 22, 1985, now U.S. Pat. No. 4,605,637, in the name of Clarence D. Chang and Joseph N. Miale. This Chang et al application, the entire disclosure of which is incorporated herein by reference, describes a process for activating a zeolite with an aluminum phosphate material.

BACKGROUND

This invention relates to catalysts comprising microporous, microcrystalline aluminum phosphates and zeolites and to conversions, e.g., hydrocarbon conversions, with these catalysts.

Aluminum phosphates are taught in U.S. Pat. Nos. 4,310,440 and 4,385,994, for example. Aluminum phosphate materials have electroneutral lattices and, therefore, are not particularly useful as ion-exchangers or as catalyst components. Microporous aluminum phosphates may have an organic amine or quaternary ammonium salt entrapped within the aluminum phosphate and playing a role as crystallization template. In addition to this organic template, water may fill the microporous voids of the aluminum phosphate, especially in its as synthesized form. Because of the aluminum/phosphorus atomic ratio of these materials being about unity, they display virtually no ion-exchange properties, the framework positive charge on phosphorus being balanced by corresponding negative charge on aluminum:

$$AlPO_4 = (AlO_2^-)(PO_2^+)$$

U.S. Pat. No. 4,310,440 indicates that the aluminum phosphates described therein may be used as catalysts or catalyst bases. With regard to the latter use it is noted that these aluminum phosphates may be impregnated with catalytically active metals. Note column 47, lines 40–49 of this U.S. Pat. No. 4,310,440. However, there is no particular statement in this patent that the aluminum phosphates may be used as catalysts or catalyst bases in combination with zeolites.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ mole ratio of a given aluminosilicate zeolite is often variable. For example, zeolite X can be synthesized with $SiO_2/Al_2O_3$ ratios of from 2 to 3; zeolite Y, from 3 to about 6. In some aluminosilicate zeolites, the upper limit of the $SiO_2/Al_2O_3$ ratio is unbounded. Aluminosilicate ZSM-5 is one such example wherein the $SiO_2/Al_2O_3$ ratio is at least 5 and up to infinity. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5 type zeolites. U.S. Pat. Nos. 4,061,724, 4,073,865 and 4,104,294 describe crystalline silicates or organosilicates of varying alumina and metal content.

A number of synthetic zeolites have been prepared which may be said to be isostructural with naturally occurring zeolites. Zeolites ZSM-35 and ZSM-38 are, for instance, ferrierite-type zeolites. Zeolite ZK-20 (U.S. Pat. No. 3,459,676) is described as being isostructural with the naturally occurring zeolite levynite.

Although zeolites may contain silica and alumina, it is recognized that the silica and alumina portions may be replaced in whole or in part with other oxides. More particularly, $GeO_2$ is an art recognized substitute for $SiO_2$ and $B_2O_3$, $Cr_2O_3$, $Fe_2O_3$, and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and, optionally, aluminum atoms in the crystalline lattice structure thereof, as opposed to materials which contain substantial amounts of suitable replacement atoms for such silicon and/or aluminum.

As mentioned previously, the catalysts of the present invention may be used in hydrocarbon conversions. Examples of such conversions are dewaxing processes.

Catalytic dewaxing of hydrocarbon oils to reduce the temperature at which separation of waxy hydrocarbons occurs is a known process. A process of that nature is described in The Oil and Gas Journal dated Jan. 6, 1975, at pages 69–73. See also U.S. Pat. No. 3,668,113 and U.S. Pat. No. 3,894,938 which describe dewaxing followed by hydrofinishing.

U.S. Pat. No. Re. 28,398 describes a process for catalytic dewaxing with a catalyst comprising a zeolite of the ZSM-5 type. A hydrogenation/dehydrogenation component may be present.

A process for hydrodewaxing a gas oil with a ZSM-5 type catalyst is described in U.S. Pat. No. 3,956,102.

A mordenite catalyst containing a Group VI or a Group VIII metal is used to dewax a low V.I. distillate from a waxy crude, as described in U.S. Pat. No. 4,110,056.

Other patents which describe various catalytic dewaxing processes include U.S. Pat. Nos. 3,755,138; 4,053,532; 4,247,388; 4,474,618; and 4,486,296.

Catalytic dewaxing may be employed to dewax a variety of distillate feedstocks such as gas oils, coker bottoms, reduced crudes, recycle oils and FCC bottoms. Catalytic dewaxing may also be employed to dewax various lube stocks.

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structure types. This complexity and its consequences are referred to in well-known treatises, such as, for example, in "Petroleum Refinery Engineering", by W. L. Nelson, McGraw Hill Book Company, Inc., New York, N.Y., 1958 (Fourth Edition).

In general, the basic premise in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated fractions were recombined one would reconstitute the crude oil.

A refined lubricant stock may be used as such as a lubricant, or it may be blended with another refined lubricant stock having different properties. Or, the refined lubricant stock prior to use as a lubricant, may be compounded with one or more additives which function, for example, as antioxidants, extreme pressure additives, and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° F. to 1050° F. After preparation of a raw stock of suitable boiling range, it is extracted with a solvent, e.g., furfural, phenol, sulfolane, or chlorex, which is selective for aromatic hydrocarbons, and which removes undesirable components. The raffinate from solvent refining is then dewaxed.

If the resulting lube stock is not dewaxed catalytically, it is generally dewaxed by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

The entire disclosures of the above-mentioned U.S. patents are expressly incorporated herein by reference.

SUMMARY

According to one aspect of the invention there is provided a catalyst composition comprising (i) a catalytically active crystalline silicate and (ii) a crystalline aluminum phosphate.

According to another aspect of the invention there is provided a catalyst composition comprising:
(i) a catalytic amount of a zeolite capable of sorbing n-hexane and catalytically converting said n-hexane to one or more different hydrocarbons by virtue of acid sites within the interior lattice structure of said zeolite; and
(ii) a catalyst lifetime and activity enhancing amount of an aluminum phosphate having a microporous framework structure in which the pores are uniform and have nominal diameters within the range of about 3 to 10 Angstroms, said aluminum phosphate having an intracrystalline adsorption capacity for water at 4.6 torr and 24° C. of at least 3.5 weight percent, the adsorption and desorption of water being completely reversible while retaining the same essential aluminum phosphate framework topology in both the hydrated and dehydrated state.

According to another aspect of the invention there is provided a method for increasing the activity and catalyst lifetime of a zeolite catalyst, said method comprising combining with said zeolite catalyst an effective amount of a microporous aluminum phosphate.

According to another aspect of the invention, there is provided a process for preparing one or more hydrocarbons, said process comprising contacting a feedstock capable of being converted into said hydrocarbon or hydrocarbons with the catalyst composition of the present invention.

EMBODIMENTS

The zeolites useful herein, after activation, acquire an intracrystalline sorption capacity for normal hexane which is greater than that for water, i.e. they exhibit "hydrophobic" properties.

The zeolites useful herein have an effective pore size such as to freely sorb normal hexane. In addition, the structure may provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded. Windows of at least 10-membered rings are preferred, although in some instances excessive puckering of the rings or pore blockage may render these zeolites ineffective.

Although 12-membered rings in theory would not offer sufficient constraint to produce certain advantageous conversions, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses a constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention may have a Constraint Index of less than 12, e.g., 1 to 12. Constraint Index (CI) values for some typical materials are:

|  | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |
| Clinoptilolite | 3.4 |
| Beta | 1.5 |
| H—Zeolon (mordenite) | 0.4 |
| REY | 0.4 |
| Amorphous Silica-Alumina | 0.6 |
| Erionite | 38 |

The above-described Constraint Index may be used to define zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the constraint index. Therefore, it will be appreciated that it may be possible to so select test conditions as to establish more than one value in the range of, e.g., 1 to 12 for the Constraint Index of a particular zeolite. Such a zeolite is to be regarded as having a Constraint Index in the range of 1 to 12. Also contemplated herein as having a Constraint Index in the range of 1 to 12 are those zeolites which, when tested under two or more sets of conditions within the above-specified ranges of temperatures and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value as used herein is an inclusive rather than an exclusive value. That is, a crystalline zeolite when identified by any combination of conditions within the testing definition set forth herein as having a Constraint Index in the range of 1 to 12 is intended to have such a Constraint Index whether or not the same identical zeolite, when tested under other of the defined conditions, may give a Constraint Index value outside of the range of 1 to 12.

Zeolites useful herein include ZSM-5, ZSM-11, ZSM-12, ZSM-23, ZSM-35, ZSM-38, ZSM-48, and other similar materials.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is described in U.S. Pat. No. 4,397,827. The description of that zeolite, and particularly the X-ray diffraction pattern thereof, is incorporated herein by reference.

It is to be understood that by incorporating by reference the foregoing patents to describe examples of specific zeolites with greater particularity, it is intended that identification of the therein disclosed crystalline zeolites be resolved on the basis of their respective X-ray diffraction patterns. The incorporation of the identified patents should not be construed as limiting the disclosed crystalline zeolites to those being aluminosilicate zeolites, especially those having the specific silica-alumina mole ratios discussed therein. It is the crystal structure, as identified by the X-ray diffraction "fingerprint", which establishes the identity of the specific crystalline zeolite material.

Other zeolites suitable for use herein include mordenite, dealuminized Y, REY (i.e., rare earth exchanged Y) and zeolite Beta.

Zeolites when prepared in the presence of organic cations, are substantially catalytically inactive, possibly because the intra-crystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of certain zeolites; however, the presence of these cations does appear to favor the formation of such zeolites. More generally, it is desirable to activate this type catalyst by base exchange with ammonium salts followed by calcination in air at about 540° C. for from about 15 minutes to about 24 hours.

Natural zeolites may sometimes be converted to zeolite structures suitable for use herein by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite.

The zeolites hereof may have among other things a crystal framework density, in the dry hydrogen form, of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

Without being bound by any theory, it is theorized that it is possible that sustained activity and stability of certain zeolites may be associated with their high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which may not be within the purview of this invention, are:

|  | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

The silica to alumina ratio of aluminosilicate zeolites useful herein may be at least 12, i.e., from about 12 to about 500.

Examples of aluminum phosphates useful herein are given in U.S. Pat. No. 4,310,440 and include $AlPO_4$-5, $AlPO_4$-8, $AlPO_4$-9, $AlPO_4$-11, $AlPO_4$-12, $AlPO_4$-14, $AlPO_4$-16, $AlPO_4$-17, $AlPO_4$-18, $AlPO_4$-20, $AlPO_4$-21, $AlPO_4$-22, $AlPO_4$-23, $AlPO_4$-25, $AlPO_4$-26, $AlPO_4$-28 and $AlPO_4$-31.

The aluminum phosphate component may be essentially catalytically inactive. Surprisingly, however, when used in sufficient amounts, the aluminum phosphate component may enhance the catalyst lifetime and activity of the zeolite. The zeolite may constitute from about 5 to about 95 weight percent of the total weight of the zeolite plus the aluminum phosphate.

The aluminum phosphate component may act as a binder for the zeolite component. Optionally, however, separate binder or matrix materials may be used.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite and aluminum phosphate include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites and aluminum phosphates employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite and aluminum phosphate components and inorganic oxide gel matrix, on an anhydrous basis, may vary widely with the zeolite and aluminum phosphate content ranging from between about 1 to about 99 percent by weight and more usually in the range of about 5 to about 80 percent by weight of the dry composite.

Another optional component of the catalysts suitable for use in accordance with the present invention comprises a minor proportion, e.g., from about 0.05% to 50% by weight of the catalyst composite, of a difficultly reducible oxide. Oxides of this type can include oxides of phosphorus as well as those oxides of the metals of Groups IA, IIA, IIIA, IVA, VA, VIA, VIIA, VIIIA, IB, IIB, IIIB, IVB, or VB of the Periodic Chart of the Elements (Fisher Scientic Company, Catalog No. 5-702-10) which serve to enhance the para-selectivity properties of the catalysts modified therewith. The difficultly reducible oxides most commonly employed to modify the selectivity properties of the zeolite-based catalysts herein are oxides of phosphorus and magnesium. Thus, the catalysts prepared herein can be treated with phosphorous and/or magnesium compounds in the manner described in U.S. Pat. Nos. 3,894,104; 4,049,573; 4,086,287; and 4,128,592, the disclosures of which are incorporated herein by reference.

In addition to treatment of the zeolite composites to incorporate phosphorus and/or magnesium oxides as hereinbefore described in detail, such zeolites may also be modified in a substantially similar manner to incorporate thereon a variety of other oxide materials to enhance para-selectivity. Such oxide materials include oxides of boron (U.S. Pat. No. 4,067,920); antimony (U.S. Pat. No. 3,979,472); beryllium (U.S. Pat. No. 4,260,843); Group VIIA metals (U.S. Pat. No. 4,275,256); alkaline earth metals (U.S. Pat. No. 4,288,647); Group IB metals (U.S. Pat. No. 4,276,438); Group IVB metals (U.S. Pat. No. 4,278,827); Group VIA metals (U.S. Pat. No. 4,259,537); Group IA elements (U.S. Pat. No. 4,329,533); cadmium (U.S. Pat. No. 4,384,155); iron and/or cobalt (U.S. Pat. No. 4,380,685); Group IIIB metals (U.S. Pat. No. 4,276,437); Group IVA metals (U.S. Pat. No. 4,302,620); Group VA metals (U.S. Pat. No. 4,302,621); and Group IIIA elements (U.S. Pat. No. 4,302,622).

The catalyst suitable for use in accordance with the present invention may also include an optional hydrogenation component. Such hydrogenation components are also known as hydrogenation/dehydrogenation components and are well known in the art. Note column 8, lines 3-14 of the Brennan et al. U.S. Pat. No. 3,759,821.

More particularly, hydrogenation components can include metals, oxides, and sulfides of metals of the Periodic Table which fall in Group VI-B including chromium, molybdenum, tungsten and the like; Group II-B including zinc and cadmium; Group VII-B including manganese and rhenium and Group VIII including cobalt, nickel, platinum, palladium, ruthenium, rhodium, and the like, and combinations of metals, sulfides and oxides of metals of Group VI-B and VIII, such as nickel-tungsten-sulfide, cobalt oxide-molybdenum oxide and the like.

The hydrogenation component may be incorporated into the catalyst by ion exchange with or impregnation on the zeolite portion thereof. For example, the zeolite containing catalyst may be modified with a Group VIII metal by soaking it in a solution, usually aqueous, of a suitable compound containing the desired Group VIII metal. The compound can be any compound usually used in catalyst manufacture, preferably one in which the components other than the Group VIII metal will be driven off when heated to dryness or calcined. Suitable compounds include metal chlorides, nitrates, acetates, and the ammine complexes. Typical techniques for preparing the catalysts containing hydrogenation/-dehydrogenation components are demonstrated in the Examples.

The catalysts of the present invention are useful for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

It is noted that each of the above-mentioned organic compound conversion processes result in the preparation of hydrocarbons, either intentionally as in aromatization reactions or consequentially as in certain cracking processes such as dewaxing.

Feedstocks which may be contacted with the catalysts of the present invention may comprise one or more compounds selected from the group consisting of alcohols, ethers and hydrocarbons which are different from the hydrocarbon or hydrocarbons being prepared. Particular examples of such feedstocks include whole crude petroleum, reduced crudes, vacuum tower distillates, vacuum tower residua, solvent refined raffinates, propane deasphalted residua, cycle oils, FCC tower bottoms, gas oils, vacuum gas oils, deasphalted residua, kerosene, jet fuels, lubricating oil stocks, and heating oils. The catalysts may be maintained in a fixed, slurry, or moving bed unit.

When the catalyst of the present invention is used in a distillate dewaxing process, the feedstock for the present conversion process may comprise a heavy hydrocarbon oil such as a gas oil, coker tower bottoms fraction reduced crude, vacuum tower bottoms, deasphalted vacuum resids, FCC tower bottoms, cycle oils. Oils derived from coal, shale or tar sands may also be treated in this way. Oils of this kind gnerally boil above 650° F. although the process is also useful with oils which have initial boiling points as low as 500° F. These heavy oils comprise high molecular weight long chain paraffins and high molecular weight aromatics with a large proportion of fused ring aromatics. The heavy hydrocarbon oil feedstock will normally contain a substantial amount boiling above 450° F. and will normally have an initial boiling point of about 550° F., more usually about 650° F. Typical boiling ranges will be about 650° to 1050° F. or about 650° F. to 950° but oils with a narrower boiling range may, of course, be processed, for example, those with a boiling range of about 650° F. to 850° F. Heavy gas oils are often of this kind as are cycle oils and other non-residual materials. It is possible to co-process materials boiling below 500° F., but the degree of conversion will be lower for such components. Feedstocks containing lighter ends of this kind will normally have an initial boiling point above about 300° F.

The present distillate dewaxing process is of particular utility with highly paraffinic feeds because, with feeds of this kind, the greatest improvement in pour point may be obtained. However, most feeds will contain a certain content of polycyclic aromatics.

The distillate dewaxing processing is carried out under conditions similar to those used for conventional hydrocracking although the use of a highly siliceous zeolite catalyst permits the total pressure requirements to be reduced. Process temperatures of 450° F. to 930° F. may conveniently be used although temperatures above 800° F. will normally not be employed as the thermodynamics of the hydrocracking reactions become unfavorable at temperatures above this point. Generally, the temperatures of 570° F. to 800° F. will be employed. Total pressure is usually in the range of 100 to 3000 psig and the higher pressures within this range over 1000 psig will normally be preferred. The process is operated in the presence of hydrogen and hydrogen partial pressures will normally be 2300 psig or less. The ratio of hydrogen to the hydrocarbon feedstock (hydrogen circulation rate) will normally be from 100 to 20,000 SCF/bbl. The space velocity of the feedstock will normally be from 0.1 to 20 LHSV, preferably 0.1 to 10 LHSV. At low conversions, the n-paraffins in the feedstock will be converted in preference to the iso-paraffins but at higher conversions under more severe conditions the iso-paraffins will also be converted. The product is low in fractions boiling below 300° F. and in most cases the product will have a boiling range of about 300° to 650° F.

The conversion may be conducted by contacting the feedstock with a fixed stationary bed of catalyst, a fixed fluidized bed or with a transport bed. A simple configuration is a trickle-bed operation in which the feed is allowed to trickle through a stationary fixed bed. With such a configuration, it is desirable to initiate the reaction with fresh catalyst at a moderate temperature which is of course raised as the catalyst ages, in order to maintain catalytic activity. The catalyst may be regenerated by contact at elevated temperature with hydrogen gas, for example, or by burning in air or other oxygen-containing gas.

A preliminary hydrotreating step to remove nitrogen and sulfur and to saturate aromatics to naphthenes without substantial boiling range conversion will usually improve catalyst performance in distillate dewaxing and permit lower temperatures, higher space velocities, lower pressures or combinations of these conditions to be employed.

In addition to distillate dewaxing processes, the catalysts of the present invention may also be used in lube dewaxing processes. Suitable feedstocks for such lube dewaxing processes include various lube stocks such as solvent refined light neutral raffinates, solvent refined heavy neutral raffinates, light neutral stocks, heavy neutral stocks, solvent refined bright stock raffinates, hydrotreated light neutral stocks, hydrotreated heavy neutral stocks, hydrotreated bright stocks and bright stocks. Suitable conversion conditions for lube dewaxing include, e.g., a temperature of from about 450° F. to about 750° F., preferably from about 500° F. to about 700° F.; a pressure of from about 100 psig to about 2000 psig, preferably from about 200 psig to about 800 psig; a liquid hourly space velocity of the feedstock (LHSV) of from about 0.1 to about 10, preferably from about 0.2 to about 5; and a ratio of hydrogen to the hydrocarbon feedstock (hydrogen circulation rate) of from about 200 SCF/bbl to about 8000 SCF/bbl, preferably from about 500 SCF/bbl to about 5000 SCF/bbl.

EXAMPLE 1

AlPO$_4$-5 was prepared in a manner similar to that disclosed in Ex. 5 of U.S. Pat. No. 4,310,440 using 85% phosphoric acid, hydrated alumina (pseudo-boehmite phase), and triethylamine as template. Crystallization was effected in a teflon-lined autoclave at 195° C. for 27 hours at autogeneous pressure. X-ray diffraction of the dried product indicated that AlPO$_4$-5 was the major phase.

EXAMPLE 2

An as-synthesized ZSM-5 sample was converted into an ammonium form by initial air calcination for 3 hours at 1000° F. to remove organic directing agent followed by ammonium exchange in duplicate with 1.0M ammonium chloride for 24 hours at room temperature.

EXAMPLE 3

An as-synthesized zeolite Beta was dried at 230° F., then doubly exchanged with 1M ammonium nitrate for one hour at room temperature. The product dried at 230°–250° F. overnight has the following composition, wt %:

| | |
|---|---|
| SiO$_2$ | 80.0 |
| Al$_2$O$_3$ | 2.7 |
| Na | .055 |
| C | 10.5 |
| N | 1.44 |
| Ash | 80.8 |

EXAMPLE 4

A nickel-impregnated 65:35 composite of ZSM-5 and AlPO$_4$-5 was prepared as follows. A mixture of 79.9 g as-synthesized AlPO$_4$-5, prepared substantially in accordance with Example 1, and 133.1 g ammonium ZSM-5 prepared substantially in accordance with Example 2, was sized to 14/25 mesh. 159.9 g of this mixture was impregnated with a solution of 7.43 g of Ni(NO$_3$)$_2$.6H$_2$O in 73.6 g water (required for incipient wetness). The product was dried overnight at 250° F. and calcined at 1000° F. in air for one hour. The final composite had the following comoposition (wt %):

| | |
|---|---|
| SiO$_2$ | 62.7 |
| Al$_2$O$_3$ | 16.4 |
| P$_2$O$_5$ | 14.0 |
| Na | <0.01 |
| Ni | 1.0 |
| Ash | 98.37 |

EXAMPLE 5

A Pt-containing 65:35 composite of zeolite Beta and AlPO$_4$-5 was prepared as follows. 49.1 g of organic-ammonium zeolite Beta (80.8% ash), prepared substantially in accordance with Example 3, was mixed with 25 g as-synthesized AlPO$_4$-5 (87.6% ash), prepared substantially in accordance with Example 1, and with 51 g water. The mixture was dried for 2 days at room temperature and sized to 14/25 mesh. This dried composite was nitrogen precalcined and air calcined 3 hours at 1000° F. each, then steamed at 1000° F. for 10 hours and exchanged with platinum tetraamine nitrate solution to give 0.6% Pt on composite.

EXAMPLE 6

The Ni-containing ZSM-5/AlPO$_4$-5 catalyst of Example 4 was presulfided with 2% H$_2$S at 700° F. until H$_2$S breakthrough. The runs were made at 400 psig H$_2$, 1 LHSV and 2500 SCF/bbl in a continuous fixed-bed microunit. The feed used in this study was a light neutral stock raffinate, and its properties are shown in Table 1. Dewaxing run data are detailed in Table 2.

TABLE 1

| PROPERTIES OF LIGHT NEUTRAL STOCK RAFFINATE | |
|---|---|
| Specific Gravity | 0.8774 |
| API, ° | 29.8 |
| Pour Point, °F. | 85 |
| Cloud Point, °F. | 120 |
| Kinematic Viscosity, cs @ 40° C. | 31.61 |
| Kinematic Viscosity, cs @ 100° C. | 5.341 |
| Sulfur, wt % | 0.76 |
| Basic Nitrogen, ppm | 45 |
| Hydrogen, wt % | 13.70 |
| Aniline Point | 212.50 |
| Total Acid Number | 0.170 |
| Color ASTM Oil | Less than 1 |
| Sim. Distillation, ASTM D2887 | |
| 10% 744.9° F. | |
| 30% 794.8° F. | |
| 50% 829.6° F. | |
| 70% 865° F. | |
| 90% 906.4° F. | |

TABLE 2

| | Feed Charge | MB #1 | MB #2 | MB #3 | MB #4 | MB #5 | MB #6 |
|---|---|---|---|---|---|---|---|
| LUBE DEWAXING RUN DATA 400 psig H$_2$, 2500 SCF/bbl | | | | | | | |
| Temperature, °F. | | 540 | 550 | 540 | 545 | 550 | 558 |
| Time On Stream, Days | | 0.5 | 1.5 | 2.5 | 3.5 | 5.5 | 7.5 |
| Run Time, Hrs. | | 19 | 19 | 19 | 19 | 65 | 22 |
| LHSV | 1.03 | 1.00 | 1.01 | 0.99 | 0.99 | 0.72 | |
| Material Balance, % | — | 97.0 | 97.3 | 95.6 | 97.9 | 96.4 | |
| Yields, Wt. % | | | | | | | |
| C$_1$ + C$_2$ | | 0.2 | 0 | 0 | 0 | 0.1 | |
| C$_3$ | | 7.0 | 3.5 | 4.2 | 3.9 | 4.4 | |
| C$_4$ | | 6.9 | 4.1 | 4.5 | 4.3 | 5.2 | |
| C$_5$ | | 2.2 | 1.4 | 1.5 | 1.7 | 2.8 | |

TABLE 2-continued

LUBE DEWAXING RUN DATA
400 psig $H_2$, 2500 SCF/bbl

| | Feed Charge | MB #1 | MB #2 | MB #3 | MB #4 | MB #5 | MB #6 |
|---|---|---|---|---|---|---|---|
| $C_6$-650° F. | | | 9.5 | 10.3 | 9.8 | 8.9 | 8.5 |
| 650° F. + Lube | 100 | | 74.2 | 80.7 | 80.0 | 81.2 | 79.0 |
| Specific Gravity | 0.8774 | 0.8961 | 0.8981 | 0.8828 | 0.8834 | 0.8833 | 0.8856 |
| API, ° | 29.8 | 26.4 | 26.1 | 28.8 | 28.7 | 28.7 | 28.3 |
| Pour Point, °F. | 85 | −55 | −20 | 40 | 30 | 25 | 15 |
| Cloud Point, °F. | >120 | −22 | −18 | 50 | 44 | 50 | 26 |
| KV @ 40° C. | | 53.21 | 48.75 | 41.75 | 42.60 | 42.42 | 44.64 |
| KV @ 100° C. | 5.341 | 6.791 | 6.655 | 6.289 | 6.339 | 6.327 | 6.460 |
| Viscosity Index | | 74.4 | 84.7 | 96.7 | 95.2 | 95.5 | 92 |
| Sulfur, Wt. % | 0.76 | 1.04 | 0.99 | 0.91 | 0.93 | 0.86 | 0.92 |
| Basic Nitrogen, ppm | 45 | 32 | 38 | 34 | 36 | 35 | 40 |
| Nitrogen, ppm | | 36 | 40 | 40 | 42 | 36 | 40 |
| Hydrogen, Wt. % | 13.7 | 13.29 | 13.64 | 13.56 | 13.75 | 13.63 | 13.51 |
| CCR, Wt. % | | 0.01 | 0.01 | <0.01 | <0.01 | <0.01 | 0.01 |
| Bromine No. | | 4.0 | 2.5 | 2.3 | 1.8 | 2.0 | 1.5 |
| ASTM Color | <1.0 | <2.0 | 1.5 | <1.5 | <1.5 | <2.0 | <1.5 |

Figure 1:
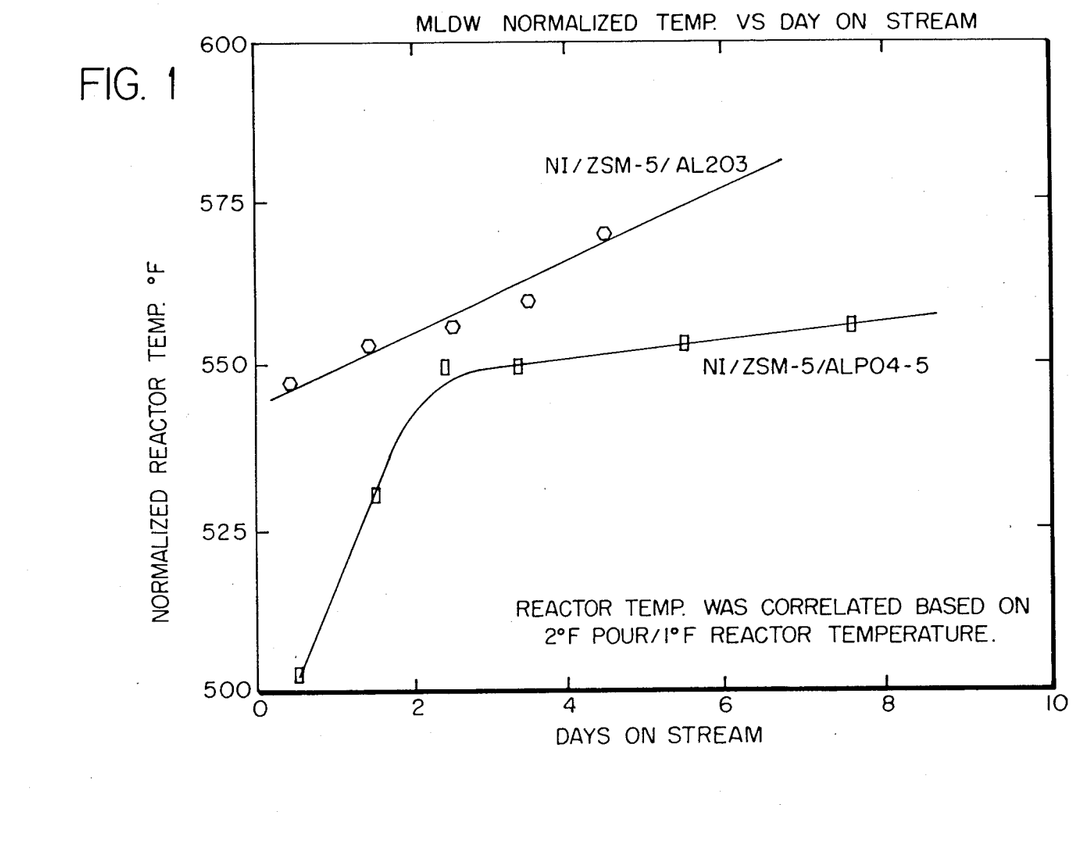
FIGS. 1 and 2 are graphs illustrating the relative performance characteristics of zeolite/aluminum phosphate catalysts compared to zeolite/alumina catalysts in dewaxing reactions.

The run was started at 540° F. The catalyst was very active on the first day on stream. The correlated start-of-cycle temperature for this catalyst was 502° F., which is at least 40° F. lower than unsteamed Ni/ZSM-5/$Al_2O_3$. After 3 days on stream, the catalyst lined out approximately 550° F. and had a low aging rate of 1° F. per day (FIG. 1). By contrast, a Ni/ZSM-5/$Al_2O_3$ lube dewaxing catalyst had a start-of-cycle temperature of 545° F. and an aging rate of 5° F. per day. Unsteamed Ni/ZSM-5/$Al_2O_3$ did not line out below 675° F., which is normally considered as the end-of-cycle temperature. Thus, the ZSM-5/$AlPO_4$-5 catalyst showed improved activity and stability over the ZSM-5/$Al_2O_3$ catalyst.

EXAMPLE 7

Figure 2:
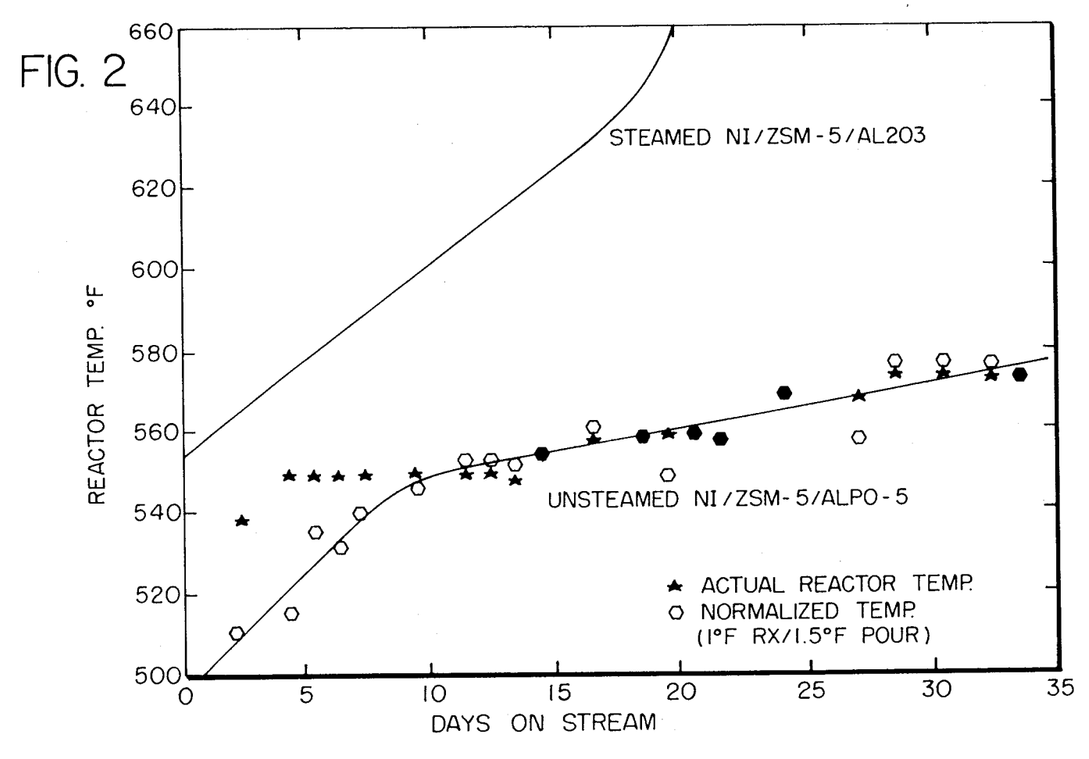

Using a fresh batch of an Ni-containing ZSM-5/$AlPO_4$-5 catalyst prepared in accordance with Example 4 as shown in FIG. 2, said catalyst being presulfided in the manner of Example 6, the dewaxing runs of Example 6 were repeated except that a heavy neutral stock raffinate was substituted for the light neutral stock raffinate of Example 6.

The Ni/ZSM-5/$AlPO_4$-5 catalyst had a start-of-cycle temperature of about 490° F. and an initial aging rate of 6° F./day, when the reactor temperatures were corrected to 20° F. pour point. However, the actual pour points for the first several days were significantly below 20° F. After 11 days on stream, the catalyst appeared to have lined-out at 555° F. with an aging rate of about 1° F. per day. Dewaxing run data are detailed in Table 3.

TABLE 3

DEWAXING RUN DATA
400 psig $H_2$, 2500 SCF/bbl

| | Feed Charge | MB #2 | MB #3 | MB #4 | MB #5 | MB #6 | MB #7 | MB #8 |
|---|---|---|---|---|---|---|---|---|
| Temperature, °F. | | 538.7 | 549.7 | 549.7 | 549.0 | 549.8 | 549.8 | 549.5 |
| Time On Stream, Days | | 2.5 | 4.5 | 5.5 | 6.5 | 7.5 | 9.5 | 11.5 |
| Run Time, Hrs. | | 65 | 20 | 21 | 21 | 21 | 65 | 21 |
| LHSV | | 0.88 | 0.86 | 1.18 | 1.00 | 1.07 | 1.11 | 1.06 |
| Material Balance, % | | 98.1 | 100.3 | 99.2 | 99.9 | 98.9 | 97.1 | 98.8 |
| Yields, Wt. % | | | | | | | | |
| $C_1 + C_2$ | | 0.1 | 0.2 | 0.2 | 0.2 | 0.2 | 0.2 | 0.2 |
| $C_3$ | | 3.9 | 6.3 | 5.1 | 6.2 | 5.3 | 4.1 | 4.1 |
| $C_4$ | | 8.8 | 9.5 | 7.6 | 9.0 | 8.0 | 7.0 | 7.0 |
| $C_5$ | | 4.6 | 4.8 | 2.4 | 3.5 | 3.0 | 3.4 | 3.4 |
| $C_6$-650° F. | | 3.2 | 4.0 | 4.7 | 3.1 | 3.4 | 3.7 | 3.3 |
| 650° F. + Lube | 100 | 79.4 | 75.2 | 80.0 | 78.0 | 80.1 | 81.6 | 82.0 |
| Specific Gravity | 0.8927 | 0.9008 | .8981 | .8981 | .8992 | .8986 | .8980 | .8974 |
| API, ° | 27.0 | 25.6 | 26.1 | 26.1 | 25.9 | 26.0 | 26.1 | 26.2 |
| Pour Point, °F. | 120 | −20 | −30 | 0 | −5 | 5 | 15 | 25 |
| Cloud Point, °F. | >120 | −18 | −28 | 6 | 4 | 14 | 20 | 30 |
| KV @ 100° F. | | 156.2 | 159.7 | 152.3 | 150.8 | 150.9 | 151.8 | 149.7 |
| KV @ 210° F. | | 13.35 | 13.41 | 13.23 | 13.13 | 13.29 | 13.31 | 13.27 |
| KV @ 40° C. | | 137.3 | 140.2 | 134.0 | 132.7 | 132.9 | 133.6 | 131.9 |
| KV @ 100° C. | 11.46 | 12.96 | 13.01 | 12.84 | 12.75 | 12.90 | 12.92 | 12.88 |
| SUS @ 100° F. | | 724 | 740 | 706 | 699 | 699 | 703 | 694 |
| SUS @ 210° F. | | 71.5 | 71.7 | 71 | 70.7 | 71.3 | 71.3 | 71.2 |
| Viscosity Index | | 85.1 | 83.2 | 86.3 | 86.2 | 88.2 | 87.9 | 88.9 |
| Sulfur, Wt. % | 0.98 | 1.20 | 1.19 | 1.17 | 1.17 | 1.18 | 1.11 | 1.13 |
| Basic Nitrogen, ppm | 61 | 74 | 73 | 73 | 72 | 71 | 73 | 72 |
| Nitrogen, ppm | 61 | 83 | 69 | 74 | 61 | 80 | 46 | 120 |
| Hydrogen, Wt. % | 13.79 | 13.24 | 13.40 | 13.42 | 13.28 | 13.22 | 13.32 | 13.41 |
| CCR, Wt. % | 0.08 | 0.09 | 0.09 | 0.09 | 0.11 | 0.08 | 0.08 | 0.09 |
| Bromine No. | 1.0 | 3.6 | 4.0 | 3.5 | 3.6 | 3.0 | 2.5 | 2.5 |
| ASTM Color | 4.5 | 2.5 | <3.0 | <3.0 | <3.5 | <3.0 | <3.5 | 3.0 |
| | MB #9 | MB #10 | MB #11 | MB #12 | MB #13 | MB #14 | MB #15 | |

TABLE 3-continued

DEWAXING RUN DATA
400 psig H$_2$, 2500 SCF/bbl

| | | | | | | | |
|---|---|---|---|---|---|---|---|
| Temperature, °F. | 548.3 | 548.4 | 554.2 | 558.0 | 559.0 | 559.4 | 559.4 |
| Time On Stream, Days | 12.5 | 13.5 | 14.5 | 16.5 | 18.5 | 19.5 | 20.5 |
| Run Time, Hrs. | 21 | 19 | 18 | 64 | 20 | 19 | 19 |
| LHSV | 0.97 | 1.06 | 0.98 | 1.21 | 1.04 | 1.11 | 0.98 |
| Material Balance, % | 100.5 | 99.8 | 97.9 | 97.1 | 103.0 | 102.6 | 100.0 |
| Yields, Wt. % | | | | | | | |
| C$_1$ + C$_2$ | 0.2 | 0.1 | 0.2 | 0.2 | 0.1 | 0.1 | 0.2 |
| C$_3$ | 4.2 | 4.0 | 3.8 | 3.1 | 3.0 | 4.3 | 3.8 |
| C$_4$ | 7.6 | 7.3 | 6.9 | 5.4 | 5.8 | 7.3 | 7.4 |
| C$_5$ | 3.8 | 3.6 | 3.3 | 2.9 | 2.9 | 4.4 | 3.1 |
| C$_6$-650° F. | 3.1 | 3.0 | 3.0 | 4.9 | 6.6 | 3.0 | 3.4 |
| 650° F. + Lube | 81.1 | 82.0 | 82.8 | 83.5 | 81.6 | 80.9 | 82.1 |
| Specific Gravity | 0.8981 | 0.8973 | 0.8983 | 0.8973 | 0.8979 | 0.8974 | 0.8976 |
| API, ° | 26.1 | 26.2 | 26.0 | 26.2 | 26.1 | 26.2 | 26.1 |
| Pour Point, °F. | 25 | 25 | 20 | 25 | 20 | 5 | 20 |
| Cloud Point, °F. | 38 | 38 | 28 | 42 | 32 | 38 | 30 |
| KV @ 100° F. | 150.2 | 148.5 | 151.5 | 147.8 | 149.9 | 147.7 | 148.4 |
| KV @ 210° F. | 13.30 | 13.27 | 13.33 | 13.22 | 13.28 | 13.21 | 13.22 |
| KV @ 40° C. | 132.3 | 130.9 | 133.4 | 130.3 | 132.0 | 130.2 | 130.8 |
| KV @ 100° C. | 12.91 | 12.89 | 12.94 | 12.84 | 12.89 | 12.83 | 12.84 |
| SUS @ 100° F. | 696 | 688 | 702 | 685 | 694 | 684 | 688 |
| SUS @ 210° F. | 71.3 | 71.2 | 71.4 | 71 | 71.2 | 71 | 71 |
| Viscosity Index | 88.9 | 89.9 | 88.4 | 89.8 | 88.9 | 89.7 | 89.3 |
| Sulfur, Wt. % | 1.13 | — | 1.14 | 1.12 | 1.11 | 1.11 | 1.12 |
| Basic Nitrogen, ppm | 68 | 66 | 70 | 69 | 69 | 69 | 70 |
| Nitrogen, ppm | 89 | 100 | 77 | 85 | 74 | 80 | 72 |
| Hydrogen, Wt. % | 13.32 | 13.50 | 13.42 | 13.30 | 13.50 | 13.25 | 13.40 |
| CCR, Wt. % | 0.12 | 0.09 | 0.09 | 0.07 | 0.12 | 0.09 | 0.11 |
| Bromine No. | 2.4 | 1.9 | 2.6 | 2.9 | 3.2 | 2.6 | 2.5 |
| ASTM Color | <3.5 | <3.5 | <3.5 | 3.0 | 3.0 | <3.5 | 3.0 |

| | MB #16 | MB #17 | MB #18 | MB #19 | MB #20 | MB #21 | MB #22 |
|---|---|---|---|---|---|---|---|
| Temperature, °F. | 558.2 | 568.8 | 568.7 | 573.7 | 573.6 | 573.1 | 573.5 |
| Time On Stream, Days | 21.5 | 24.0 | 27.0 | 28.5 | 30.5 | 32.5 | 33.5 |
| Run Time, Hrs. | 19 | 93.5 | 40 | 21 | 65 | 19 | 20.5 |
| LHSV | 0.92 | 1.05 | 0.85 | 1.00 | 0.99 | 0.92 | 0.89 |
| Material Balance, % | 99.9 | 98.0 | 99.0 | 98.5 | 98.5 | 97.7 | 98.9 |
| Yields, Wt. % | | | | | | | |
| C$_1$ + C$_2$ | 0.2 | 0.2 | 0.3 | 0.2 | 0.3 | 0.3 | 0.3 |
| C$_3$ | 3.9 | 3.5 | 4.2 | 3.9 | 4.0 | 3.6 | 3.8 |
| C$_4$ | 6.1 | 6.3 | 5.8 | 5.7 | 5.3 | 5.0 | 5.2 |
| C$_5$ | 3.8 | 3.5 | 3.5 | 3.6 | 3.4 | 2.9 | 3.3 |
| C$_6$-650° F. | 4.0 | 3.5 | 4.6 | 4.4 | 3.5 | 4.2 | 4.2 |
| 650° F. + Lube | 82.0 | 83.0 | 81.9 | 82.2 | 83.5 | 84.0 | 83.2 |
| Specific Gravity | 0.8979 | 0.8981 | 0.8988 | 0.8974 | 0.8980 | 0.8976 | 0.8975 |
| API, ° | 26.1 | 26.1 | 26.0 | 26.2 | 26.1 | 26.4 | 26.2 |
| Pour Point, °F. | 20 | 20 | 5 | 25 | 25 | 25 | 20 |
| Cloud Point, °F. | 34 | 28 | 14 | 40 | 30 | 36 | 38 |
| KV @ 100° F. | 149.6 | 149.3 | 150.7 | 147.6 | 148.4 | 148.3 | 146.1 |
| KV @ 210° F. | 13.26 | 13.23 | 13.23 | 13.20 | 13.25 | 13.24 | 13.16 |
| KV @ 40° C. | 131.8 | 131.5 | 132.7 | 130.1 | 131.6 | 130.7 | 128.8 |
| KV @ 100° C. | 12.87 | 12.85 | 12.84 | 12.82 | 12.86 | 12.87 | 12.78 |
| SUS @ 100° F. | 693 | 692 | 698 | 684 | 692 | 687 | 677 |
| SUS @ 210° F. | 71.1 | 71.1 | 71 | 70.9 | 71.1 | 71.1 | 70.8 |
| Viscosity Index | 88.8 | 88.8 | 87.6 | 89.7 | 88.9 | 89.8 | 90.3 |
| Sulfur, Wt. % | 1.12 | 1.11 | 1.14 | 1.14 | 1.12 | 1.23 | 1.23 |
| Basic Nitrogen, ppm | 67 | 67 | | 67 | 67 | 69 | 69 |
| Nitrogen, ppm | 97 | 83 | 85 | 91 | 94 | 93 | 100 |
| Hydrogen, Wt. % | 13.43 | 13.33 | 13.50 | 13.36 | 13.58 | 14.36 | 13.59 |
| CCR, Wt. % | 0.08 | 0.08 | 0.12 | 0.11 | 0.14 | 0.09 | 0.08 |
| Bromine No. | 2.9 | 3.0 | 4.9 | 4.1 | 4.1 | 4.2 | 4.5 |
| ASTM Color | 3.0 | 3.0 | <3.5 | <3.5 | <3.5 | <3.0 | <3.5 |

Dewaxing run data is also set forth in FIG. 2. Due to the lack of first cycle aging data with unsteamed Ni/ZSM-5/Al$_2$O$_3$, steamed Ni/ZSM-5/Al$_2$O$_3$ was used for comparison in FIG. 2.

EXAMPLE 8

After 34 days on stream with the heavy neutral stock of Example 7 the feed was switched to Minas LV gas oil. The properties of this Minas LVGO are listed in Table 4.

TABLE 4

Properties of Minas LV Gas Oil

| | |
|---|---|
| Gravity, °API | 35.1 |
| Pour Point, °F. | 95 |
| Cloud Point, °F. | >120 |
| KV, cs @ 40° C. | 8.671 |
| KV, cs @ 100° C. | 2.534 |
| Sulfur, wt % | 0.068 |
| Nitrogen, ppm | 180 |
| Basic Nitrogen, ppm | 74 |
| Hydrogen, wt % | 13.96 |
| Aniline Point | 202 |
| Bromine No. | 1.5 |
| Carbon Residue by MCRT, % | 0.02 |

TABLE 4-continued

| Properties of Minas LV Gas Oil | |
|---|---|
| ASTM Color | 15.0 |
| Simulated Distillation, ASTM D2887 | |
| 0.5% Off | 259.2 |
| 5% | 520.8 |
| 10% | 546.2 |
| 20% | 597.9 |
| 30% | 635.8 |
| 40% | 666.9 |
| 50% | 694.2 |
| 60% | 722.4 |
| 70% | 752.4 |
| 80% | 789.8 |
| 90% | 852.4 |
| 95% | 936.6 |
| 99.5% | 1106 |

The following table compares the dewaxing results of Minas LV gas oil over Ni/ZSM-5/AlOP$_4$-5 and Ni/ZSM-5/Al$_2$O$_3$:

| Catalyst | Ni/ZSM-5/ AlPO$_4$-5 | Ni/ZSM-5 Al$_2$O$_3$ |
|---|---|---|
| Catalyst Age, Days on Stream | 38.5 | 34.2 |
| Average reactor Temp., °F. | 684 | 721 |
| LHSV | 1.14 | 1.01 |
| Reactor Pressure, Psig H$_2$ | 400 | 400 |
| Hydrogen Circulation, SCF/bbl | 2000 | 2000 |
| 330° F.+ Pour Point, °F. | 25 | 20 |
| Yields, wt % | | |
| C$_1$-C$_2$ | 0.5 | 0.4 |
| C$_3$ | 4.0 | 3.0 |
| C$_4$ | 7.4 | 6.6 |
| C$_5$ | 7.0 | 7.0 |
| C$_6$-330° F. | 15.9 | 17.9 |
| 330° F.+ | 65.2 | 65.1 |

It is found that the ZSM-5/AlPO$_4$-5 catalyst improved the activity by approximately 40° F. while maintaining equivalent selectivities as the ZSM-5/Al$_2$O$_3$ catalyst.

What is claimed is:

1. A process for dewaxing a hydrocarbon feedstock, said process comprising contacting said feedstock under sufficient dewaxing conditions wih a catalyst composition comprising (i) a catalytically active crystalline silicate and (ii) a crystalline aluminum phosphate,
   wherein said crystalline silicate is an aluminosilicate zeolite having a silica to alumina mole ratio of from about 2 to about 500, and wherein said aluminum phosphate has a microporous framework structure in which the pores are uniform and have nominal diameters within the range of about 3 to 10 Angstroms, said aluminum phosphate having an intracrystalline adsorption capacity for water at 4.6 torr and 24° C. of at least 3.5 weight percent, the adsorption and desorption of water in said aluminum phosphate being completely reversible while retaining the same essential aluminum phosphate framework topology in both the hydrated and dehydrated state.

2. A process according to claim 1, wherein said zeolite has a Constraint Index of less than 12.

3. A process according to claim 1, wherein said zeolite is selected from the group consisting of ZSM-5, ZSM-11, ZSM-12, ZSM-23, ZSM-38, ZSM-48, mordenite, dealuminized Y, REY and Beta.

4. A process according to claim 1, wherein said aluminum phosphate is selected from the group consisting of AlPO$_4$-5, AlPO$_4$-8, AlPO$_4$-9, AlPO$_4$-11, AlPO$_4$-12, AlPO$_4$-14, AlPO$_4$-16, AlPO$_4$-17, AlPO$_4$-18, AlPO$_4$-20, AlPO$_4$-21, AlPO$_4$-22, AlPO$_4$-23, AlPO$_4$-25, AlPO$_4$-26, AlPO$_4$-28 and AlPO$_4$-31.

5. A process according to claim 1, wherein said zeolite (i) constitutes from about 5 to about 95 percent by weight of the total weight of said zeolite (i) plus said aluminum phosphate (ii).

6. A process according to claim 1, wherein said catalyst composition further comprises a binder material.

7. A process according to claim 6, wherein said binder material is alumina.

8. A process according to claim 1, wherein said zeolite (i) is ZSM-5 and said aluminum phosphate (ii) is AlPO$_4$-5.

9. A process according to claim 8, wherein said catalyst further comprises a hydrogenation/dehydrogenation component.

10. A process according to claim 8, wherein said AlPO$_4$-5 acts as a binder for said ZSM-5.

11. A process according to claim 9, wherein said catalyst composition comprises a composite of said ZSM-5 and said AlPO$_4$-5 having a ZSM-5/AlPO$_4$-5 weight ratio of 65:35 impregnated with a nickel compound followed by calcination sufficient to convert impregnated nickel compound to nickel oxide.

12. A process according to claim 1, wherein said catalyst composition is a composite of zeolite Beta and AlPO$_4$-5 having a zeolite/AlPO$_4$-5 weight ratio of 65:35, said composite being ion exchanged with a platinum compound so as to have 0.6 weight percent of platinum based upon the weight of the composite.

13. A process according to claim 1, in which said feedstock is selected from the group consisting of whole crude petroleum, reduced crudes, vacuum tower distillates, vacuum tower residua, solvent refined raffinates, propane deasphalted residua, cycle oils, FCC tower bottoms, gas oils, vacuum gas oils, deasphalted residua, kerosenes, jet fuels, lubricating oil stocks, and heating oils.

14. A process according to claim 1, wherein said catalyst composition is in a fixed, slurry, or moving bed unit.

15. A process according to claim 1, which is a lube dewaxing process, wherein a lube stock is contacted with said catalyst composition under conditions including a temperature of from about 450° F. to about 750° F., a pressure of from about 100 psig to about 2000 psig, a liquid hourly space velocity of the feedstock of from about 0.1 to about 10, and a ratio of hydrogen to the hydrocarbon feedstock of from about 200 SCF/bbl to about 8000 SCF/bbl.

16. A process according to claim 15, wherein said conditions include a temperature of from about 500° F. to about 700° F., a pressure of from about 200 psig to about 800 psig, a liquid hourly space velocity of the feedstock of from about 0.2 to about 5, and a ratio of hydrogen to the hydrocarbon feedstock of from about 500 SCF/bbl to about 5000 SCF/bbl.

17. A process according to claim 16, wherein said feedstock is a solvent refined light neutral raffinate, a solvent refined heavy neutral raffinate, a light neutral stock, a heavy neutral stock, a solvent refined bright stock raffinate, a hydrotreated light neutral stock, a hydrotreated bright stock or a bright stock.

18. A process according to claim 16, wherein said feedstock is a light neutral stock, a heavy neutral stock or a bright stock.

19. A process according to claim 18, wherein said feedstock is an atmospheric gas oil stock, vacuum gas oil stock or a coker gas oil stock.

* * * * *